(12) United States Patent
Fischbacher et al.

(10) Patent No.: US 6,997,519 B2
(45) Date of Patent: Feb. 14, 2006

(54) COATED CENTER DISK WHEEL FOR A MOTOR VEHICLE

(75) Inventors: Alfred Fischbacher, Rohrdorf (DE); Rolf-Dieter Mansdorfer, Ebersbach (DE); Siegbert Dehm, Goppingen (DE)

(73) Assignee: Südrad GmbH Radtechnik, Ebersbach (DE)

( * ) Notice: Subject to any disclaimer, the term of this patent is extended or adjusted under 35 U.S.C. 154(b) by 0 days.

(21) Appl. No.: 10/421,159

(22) Filed: Apr. 23, 2003

(65) Prior Publication Data
US 2003/0234570 A1 Dec. 25, 2003

(30) Foreign Application Priority Data
Apr. 24, 2002 (DE) .................. 102 18 339

(51) Int. Cl.
*B60B 25/00* (2006.01)
*F16B 39/24* (2006.01)

(52) U.S. Cl. .................. 301/35.621; 301/35.626; 411/156

(58) Field of Classification Search ..............
301/63.101–63.107, 35.621, 35.623, 35.624, 301/35.625, 35.632; 411/160–164, 155–156, 411/902–903, 187–188, 166, 399
See application file for complete search history.

(56) References Cited

U.S. PATENT DOCUMENTS

| | | | | |
|---|---|---|---|---|
| 1,302,858 A | * | 5/1919 | Sack | 411/138 |
| 1,666,722 A | * | 4/1928 | Tarbox | 301/35.625 |
| 1,787,074 A | * | 12/1930 | Hunt | 301/35.625 |
| 1,876,394 A | * | 9/1932 | Booth | 301/35.625 |
| 4,433,877 A | * | 2/1984 | Colanzi | 384/544 |
| 4,639,044 A | * | 1/1987 | Enders et al. | 301/35.625 |
| 4,763,392 A | * | 8/1988 | Fogal et al. | 427/327 |
| 4,856,954 A | * | 8/1989 | Peterson | 411/427 |
| 5,490,720 A | * | 2/1996 | Archibald | 301/35.621 |
| 5,971,496 A | * | 10/1999 | Duning et al. | 301/35.626 |
| 6,228,169 B1 | * | 5/2001 | Wallace | 118/308 |
| 6,416,135 B1 | * | 7/2002 | Greubel et al. | 301/64.702 |
| 6,575,535 B1 | * | 6/2003 | Meeker et al. | 301/35.621 |
| 6,749,386 B1 | * | 6/2004 | Harris | 411/544 |

FOREIGN PATENT DOCUMENTS

| | | |
|---|---|---|
| DE | 1 144 139 | 2/1963 |
| DE | 196 03 968 A1 | 9/1996 |
| DE | 198 36 239 A1 | 2/2000 |
| WO | WO 00/11238 | 3/2000 |

* cited by examiner

*Primary Examiner*—Russell D. Stormer
*Assistant Examiner*—Jason R. Bellinger
(74) *Attorney, Agent, or Firm*—Womble Carlyle

(57) ABSTRACT

A coated center disk wheel produced from sheet metal for a motor vehicle, which has a wheel-center disk (1) provided with a plurality of connecting eyes (3) which are distributed over a hole circle (2) and have in each case a through-hole (4). Around the hole is a countersink (7) against which rests, in the mounted state of the center disk wheel, the head (9) of a wheel bolt (6) projecting through the respective through-hole (4). Fastened to the wheel hub, at least a part (10) of the surface of each countersink (7) is structured by elevations (11) and indentations (12) located side by side. In the mounted state of the center disk wheel, the wheel bolt heads (9) are in contact only with the elevations (11) on those surfaces (13) which are substantially free of paint (14) with which the remaining surface of the center disk wheel is coated. The paint is removed from the contact surfaces (13) of the elevations (11) on tightening the wheel bolts (6). Loosening of the wheel bolts (6) or wheel nuts during driving is reliably prevented. The wheel bolts or wheel nuts are suitable in the same design also for the mounting of cast aluminum wheels.

20 Claims, 7 Drawing Sheets

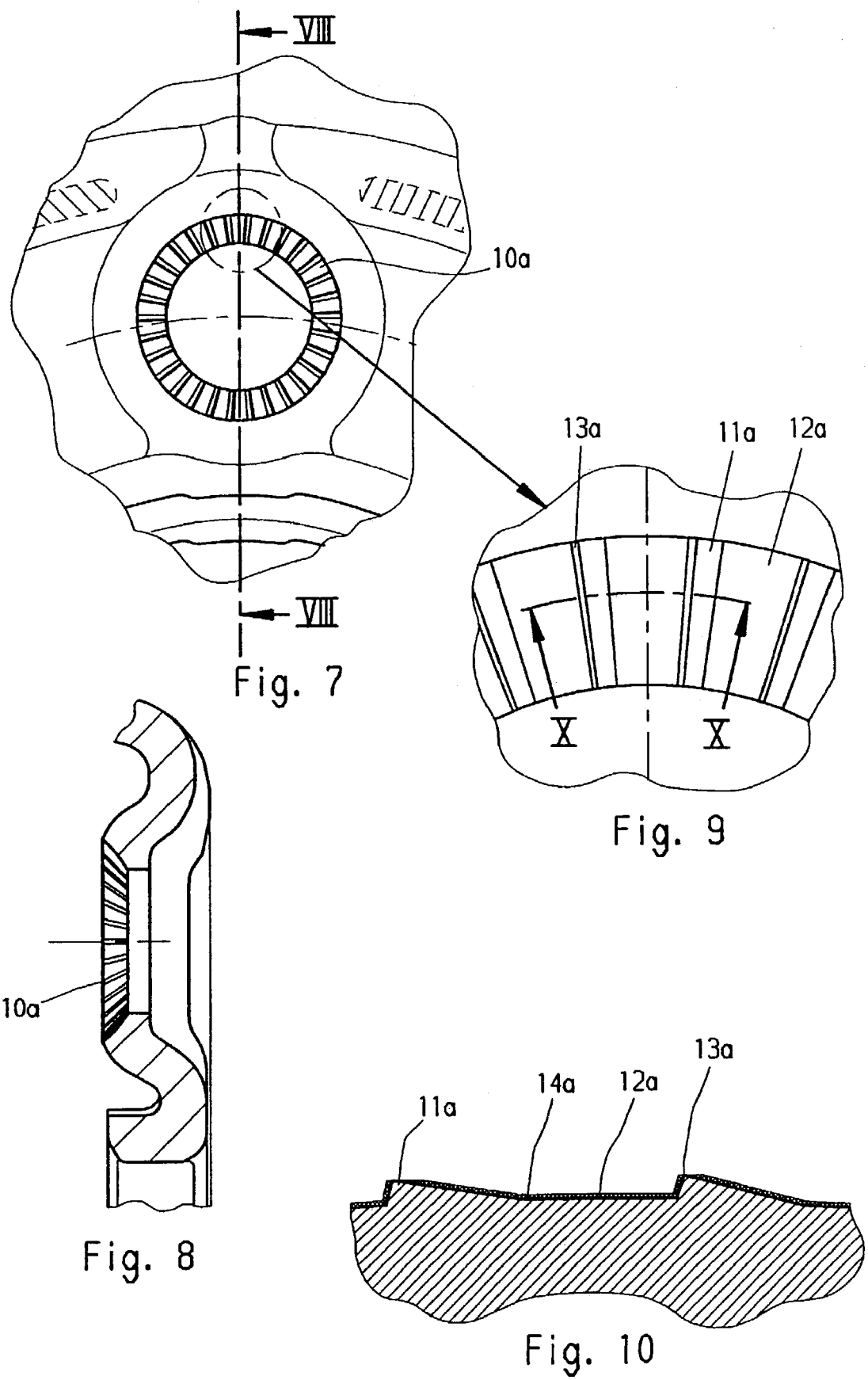

COATED CENTER DISK WHEEL FOR A MOTOR VEHICLE

RELATED APPLICATION

This application is a nonprovisional application claiming benefit of German Patent Application No. 102 18 339.2, filed Apr. 24, 2002, the content of which is hereby incorporated in its entirety.

BACKGROUND OF THE INVENTION

The invention relates to a center disk wheel of the type produced from sheet metal for mounting to the wheel hub of a motor vehicle. More particularly, it relates to a coated center disk wheel and ways to ensure secure mounting of such a wheel.

A center disk wheel is disclosed, for example, in DE 196 03 968 A1. There, it is explained that, during mounting of the wheel on the vehicle, the wheel nuts or wheel bolts are tightened with a predetermined torque, resulting in a pretensioning force in the screw bolts and a correspondingly high pressure between the connecting eyes of the wheel and the wheel hub.

When a wheel nut or a wheel bolt is turned, the moment of friction in the thread, which increases with the pretensioning force, and the moment of friction at the contact surfaces between the nut or the bolt head and the countersink have to be overcome. The magnitude of these moments of friction is dependent on the coefficients of friction which prevail at the surfaces rubbing against one another, with the result that, for the same tightening torque, the pretensioning force is higher in the case of lower coefficients of friction than in the case of higher coefficients of friction.

The magnitude of the bolt pretensioning force and therefore of the pressure between the connecting eye and the wheel hub should, however, be within predetermined limits for a specified tightening torque, since too high a bolt pretensioning force reduces the elasticity of the wheel, with the result that the wheel nuts or wheel bolts can become loose under dynamic load while driving. Too low a bolt pretensioning force can likewise lead to a loosening of the wheel nuts or wheel bolts under dynamic load while driving.

The influences or measures which change the coefficients of friction of the contact surfaces of the wheel nuts or wheel bolts and of the countersink can increase or decrease the bolt pretensioning force and therefore the pressure to a dangerously great extent. The same applies to the influences or measures which change the coefficient of friction of the threads of the wheel nuts or wheel bolts. For example, rust on the surfaces of the wheel nuts or wheel bolts, of the countersink and of the threads, which surfaces are in contact with one another, increases the coefficient of friction.

If the wheel nuts or wheel bolts are provided in an impermissible manner with lubricant, the corresponding coefficients of friction decrease, with the result that a higher bolt pretensioning force is obtained at the same tightening torque.

Coated center disk wheels have, in the countersunk region, a surface protection which as a rule is composed of a pretreatment in the form of zinc phosphating and a primer in the form of a cathodic electrocoating finish. A surface of the countersunk region which is protected in this manner has a lower coefficient of friction than an untreated, bare surface, which may tend to rust.

Wheel nuts and wheel bolts are exposed to attack by moisture on their surfaces which are not in contact with the countersink of the wheel and the threads and are therefore protected from corrosion by a surface coating. Such a surface coating is described, for example, in WO 00/11238. When wheel nuts or wheel bolts protected from corrosion by a surface coating are used for fastening coated center disk wheels, the coefficient of friction at the contact surfaces between the wheel nuts or wheel bolts and the countersink can be reduced to such an extent that the bolt pretensioning forces assume values which are so high that the elasticity of the wheel is reduced to a degree such that the dynamic load when driving can cause the bolts or nuts to become loose.

Moreover, the high pretensioning force results in a very high pressure of the wheel nut or wheel bolt on the paint coat in the countersink. As a result of the heating of the wheel hub region which occurs when driving and the pressure applied to the paint coat in the countersink by the wheel nut or the bolt head, instabilities may occur in the paint coat of the countersink. This results in a further reduction in the coefficient of friction at the contact surfaces between the wheel nuts or the bolt heads and the countersink of the connecting eye in the case of coated center disk wheels. However, if the coefficient of friction decreases in this manner after mounting of the wheel, the wheel bolts or wheel nuts may become loose owing to the dynamic load of the screw union region during driving and owing to the total elasticity of the center disk wheel itself.

The use of wheel bolts protected from corrosion by a surface coating for fastening cast light metal wheels, such as, for example, cast aluminum wheels, does not as a rule result in a reduction in the coefficient of friction at the contact surfaces between the wheel bolt and the countersink, which reduction causes loosening of the wheel bolts, because the surface in the region of the wheel bolt head receptacle in the case of the cast light metal wheel is not covered with a protective layer but is left bare after machining.

For commercial reasons, it is expedient if the same wheel bolts which are used for cast light metal wheels can also be used for coated sheet-metal center disk wheels. The use of wheel bolts of the same design both for cast light metal wheels and for coated sheet-metal center disk wheels also rules out the possibility that, for cast light metal wheels and coated sheet-metal center disk wheels, wheel bolts of different design will be accidentally used or misused for the wheel type for which they are actually inadequate.

SUMMARY OF THE INVENTION

In one aspect, the present invention is directed to a sheet-metal center disk wheel for a motor vehicle, comprising a wheel-center disk provided with a plurality of connecting eyes (i.e., bolt holes) distributed along a hole circle, each connecting eye having a through-hole surrounded by a countersink having a surface provided with elevations and indentations. The countersink has at least three elevations or at least three indentations, though it may have three or more of each, i.e., the 'or' is inclusive. At least the indentations are provided with a protective coating while the elevations have contact surfaces configured and dimensioned to contact a wheel bolt or a wheel nut, when the center disk wheel is mounted on the wheel hub of a motor vehicle.

In such a wheel, the contact surfaces may collectively form the shape of part of a cone or part of a sphere. Also, the elevations and indentations may be present only on an upper edge of the countersink. Furthermore, the elevations and indentations may comprise ribs and grooves, respectively, which alternate along a circumferential direction of the corresponding countersink. Such elevations and indentations can extend in the radial direction of the corresponding countersink. The elevations and indentations may be arc-shaped ribs and grooves, respectively. The elevations may have a rectangular or triangular cross-section. Furthermore, each countersink surface may be provided with at least 3 elevations and at least 3 indentations.

The wheel may be provided with a protective coating at least over both the elevations and indentations, including the contact surfaces. Furthermore, the contact surfaces preferably are free of protective coating when the wheel is mounted on a wheel hub of a motor vehicle.

In another aspect, the present invention is directed to a sheet-metal center disk wheel mounted on a wheel hub of a motor vehicle. The combination may include a wheel-center disk provided with a plurality of connecting eyes distributed along a hole circle, each connecting eye having a through-hole surrounded by a countersink having a surface provided with elevations and indentations including at least 3 elevations or at least 3 indentations, or both. The combination further includes wheel bolts or wheel nuts securing the wheel-center disk to the wheel hub and abutting contact surfaces belonging to the elevations of each of the countersinks, the wheel bolts or wheel nuts not being in contact with the indentations, wherein a protective coating is provided on at least the indentations, the contact surfaces being substantially free of protective coating.

Each countersink surface may be provided with at least 3 elevations and also at least 3 indentations.

In yet another aspect, the present invention is directed to a method of securing a sheet-metal center disk wheel to a wheel hub of a motor vehicle. The method comprises providing a center disk wheel comprising a wheel-center disk provided with a plurality of connecting eyes distributed along a hole circle, each connecting eye having a through-hole surrounded by a countersink having a surface provided with elevations and indentations including at least 3 elevations or at least 3 indentations, the at least 3 elevations or at least 3 indentations being provided with a protective coating, aligning the center disk wheel with the wheel hub, and securing the center disk wheel to the wheel hub by tightening wheel bolts or wheel nuts by rotation such that, during said rotation, said wheel bolts or wheel nuts abut the elevations at contact surfaces and abrade protective coating from said contact surfaces by friction while protective coating on the indentations is left substantially intact.

In accordance with this method, at least a portion of said protective coating may be captured by said indentations, as said portion is abraded from said contact surfaces. The method may also comprise providing a center disk wheel having indentations of a size sufficient to accommodate all of said protective coating that is abraded from said contact surfaces. The method may further comprise providing a center disk wheel having at least 3 elevations and at least 3 indentations.

BRIEF DESCRIPTION OF THE DRAWINGS

The present invention is described with reference to the attached drawings in which:

FIGS. 7–10 show diagrams similar to those of FIGS. 3 to 6, but the structured surface of the countersink is formed according to a second embodiment;

FIGS. 21–26 show diagrams similar to those of FIGS. 3 to 6, but the structured surface of the countersink is formed according to a sixth embodiment.

DETAILED DESCRIPTION OF THE INVENTION

Figure 1:
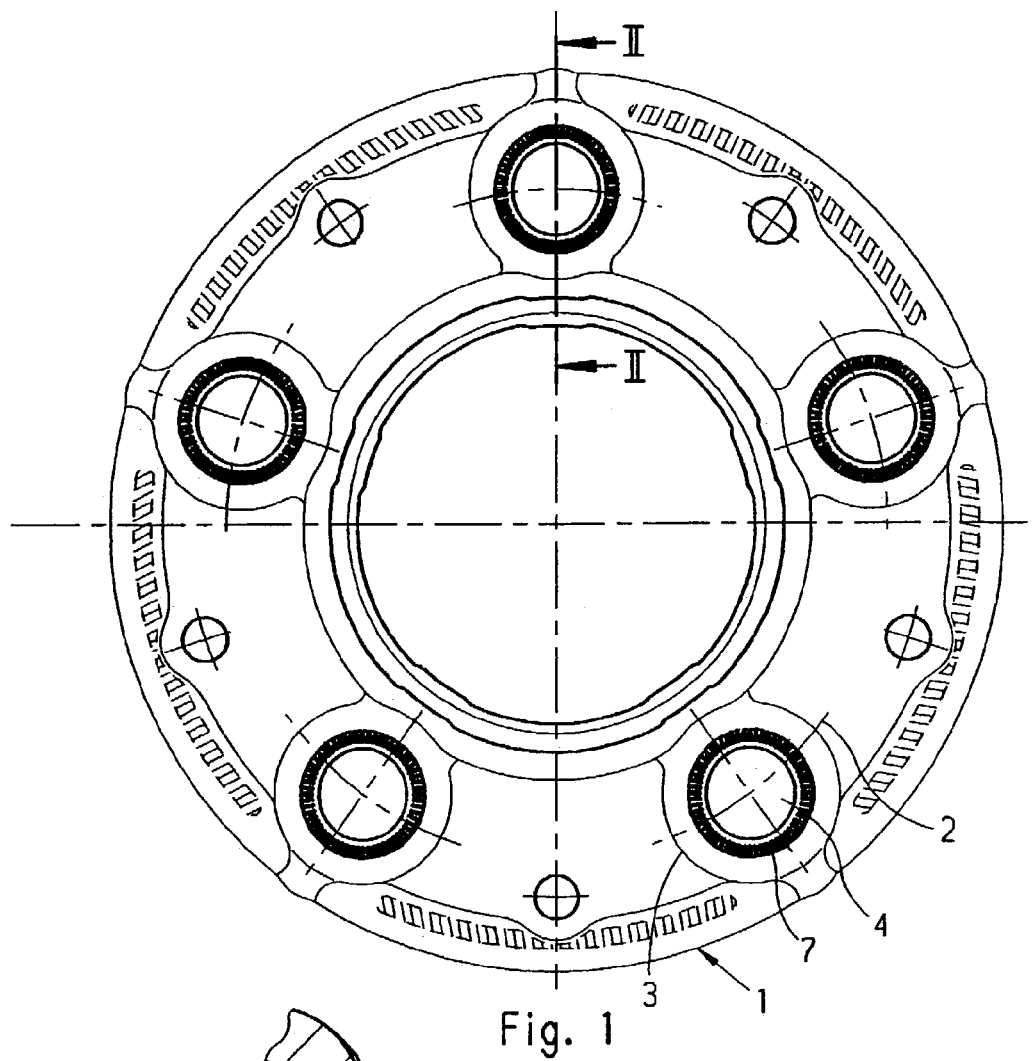
FIG. 1 shows a plan view of the radially inner region of the wheel-center disk of a center disk wheel according to a first embodiment of the invention, which radially inner region has the connecting eyes.

Reference is first made to FIGS. 1 to 6 which show a first embodiment of the invention. A center disk wheel produced from steel sheet or aluminum sheet and intended for motor vehicles has a wheel-center disk 1 which is welded at its radially outer edge to a rim which is not shown. FIG. 1 shows the radially inner region of the wheel-center disk 1. Present in this region is a plurality of connecting eyes 3 (i.e., "bolt holes") which are distributed uniformly over a hole circle 2 in the circumferential direction and in each case have a through-hole 4 for the passage of the shaft 5 of a wheel bolt 6. The wheel is fastened to a wheel hub of the motor vehicle by means of the wheel bolts 6, said wheel hub not being shown. For this purpose, threaded holes into which the shafts 5 of the wheel bolts 6 are screwed are present in the wheel hub, with the result that the wheel is pressed against the wheel hub in the region of the connecting eyes.

A countersink 7 which serves for receiving a centering collar 8 of the head 9 of the wheel bolt 6 during mounting of the wheel on the vehicle is provided around the through-hole 4 of each connecting eye 3, on the outside of the wheel-center disk 1 which faces away from the wheel hub of the motor vehicle.

In the first embodiment shown in FIGS. 1 to 6, the wheel-center disk has five connecting eyes 3. However, it is evident that the number of connecting eyes can also be greater or less than five.

In the embodiment shown, a number of wheel bolts 6 corresponding to the number of connecting eyes is provided for fastening the wheel to the wheel hub of the motor vehicle. However, the fastening of the wheel to the wheel hub can also be effected by means of stud bolts fastened to the wheel hub and wheel nuts which are then screwed onto the stud bolts projecting through the holes of the connecting eyes. However, the invention is not altered by the fact that, instead of wheel bolts, wheel nuts are used in combination with stud bolts for fastening the center disk wheel to the wheel hub of the motor vehicle.

Furthermore, of course, the center disk wheel can be fastened to a brake drum instead of to the wheel hub if the chassis of the motor vehicle has a brake drum instead of a hub at the wheel fastening point. The use of the term "wheel hub" in the description is therefore not intended to mean that the center disk wheel can be fastened only to a wheel hub but that it can also be fastened to a brake drum if the motor vehicle has a brake drum instead of a wheel hub.

According to the invention, at least a part of the surface of each countersink 7 is structured by elevations and indentations located side by side. Preferably, at least 3 elevations and/or at least 3 indentations. However, many more than this number, such as 60, or more, of either or both elevations and indentations, such as seen in FIG. 3, may be provided. In the embodiment shown in FIGS. 1 to 6, only a part of the surface of each countersink 7 is structured with elevations and indentations located side by side. The structured surface of the countersink 7 of the embodiment shown in FIGS. 1 to 6 is denoted in FIGS. 3 and 4 by 10.

Figure 5:
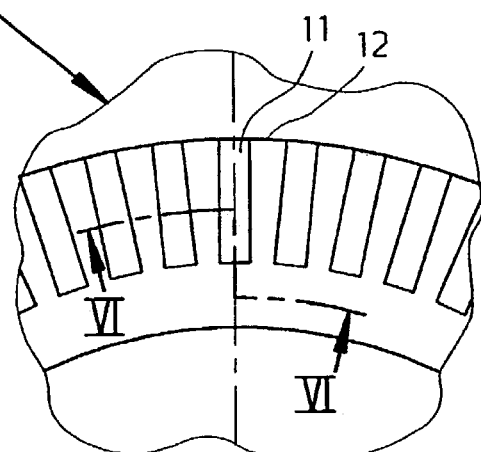
FIG. 5 shows a cut-out on a larger scale of the structured surface of the countersink, shown in FIG. 3, at the point circled in FIG. 3 and provided with a reference arrow.
Figure 4:
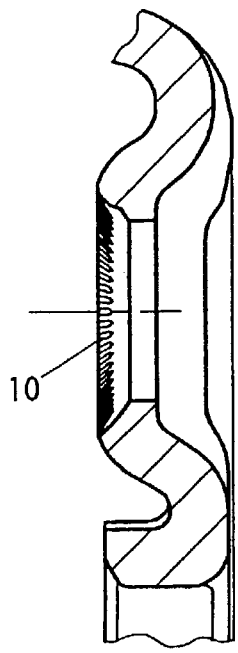
FIG. 4 shows a section, corresponding to the section of FIG. 2, along the line IV—IV in FIG. 3, but without the wheel bolt shown in FIG. 2.
Figure 6:
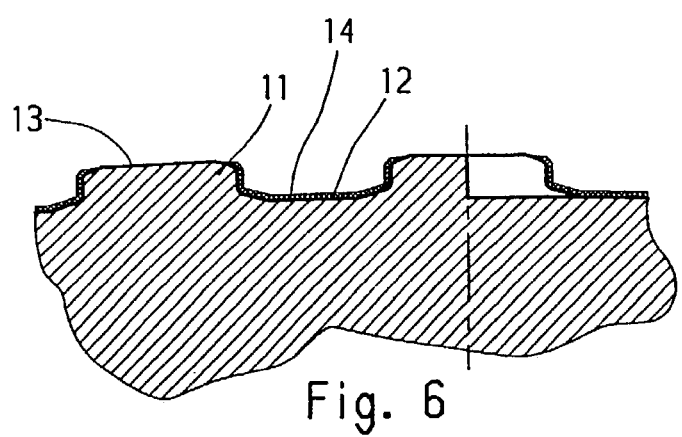
FIG. 6 shows a partial section on a larger scale along the line VI—VI in FIG. 5.
Figure 11:
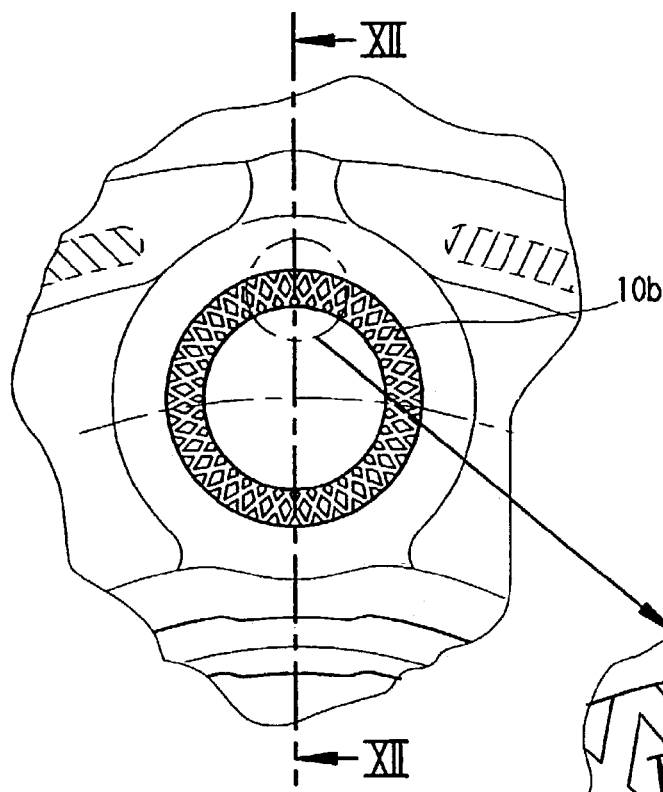
FIGS. 11–14 show diagrams similar to those of FIGS. 3 to 6, but the structured surface of the countersink is formed according to a third embodiment.
Figure 13:
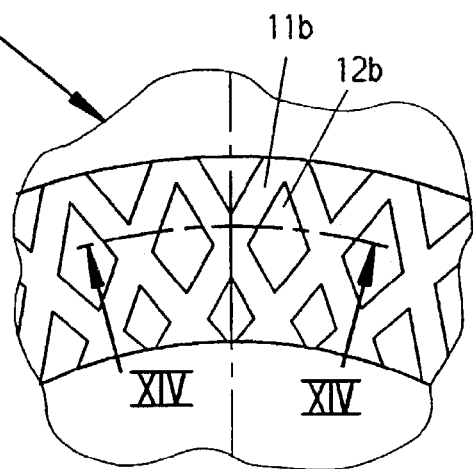
Figure 12:
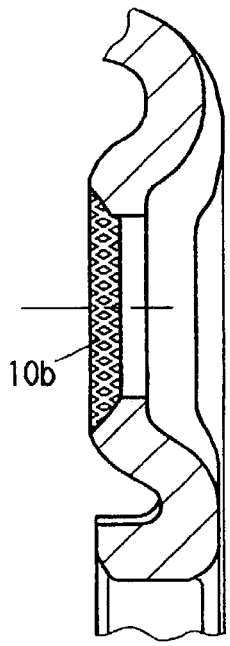
Figure 14:
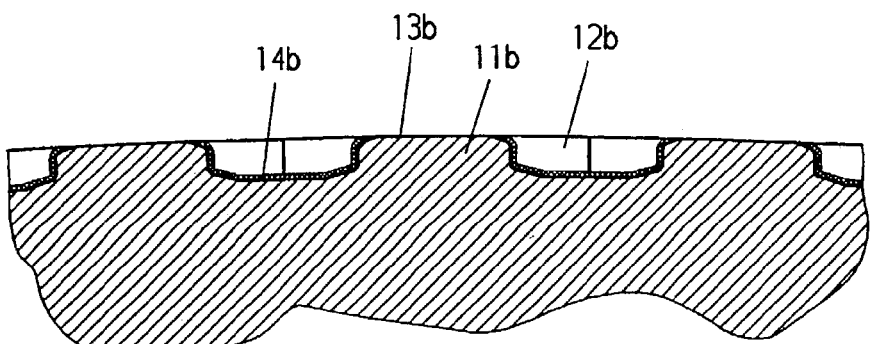
Figure 15:
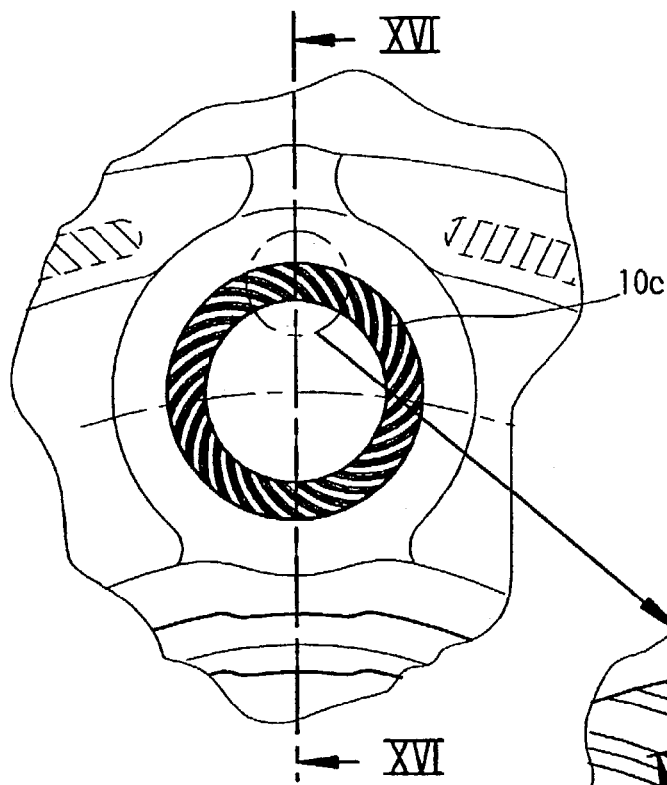
FIGS. 15–18 show diagrams similar to those of FIGS. 3 to 6, but the structured surface of the countersink is formed according to a fourth embodiment.
Figure 16:
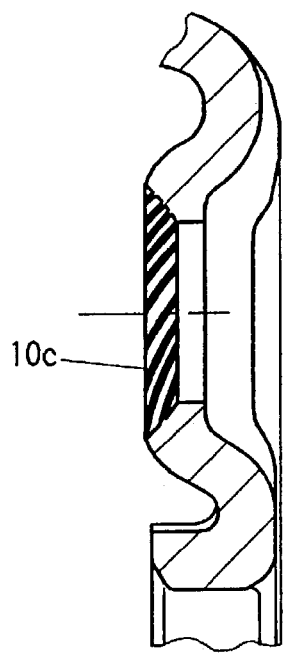
Figure 17:
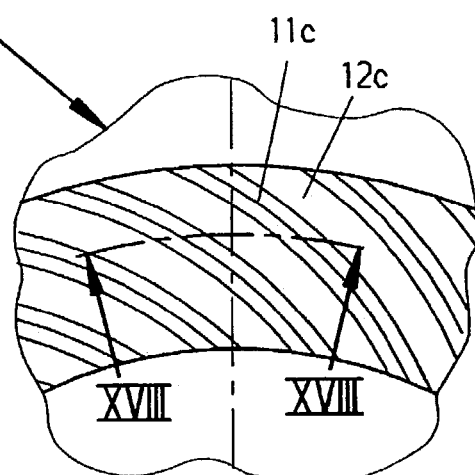
Figure 18:
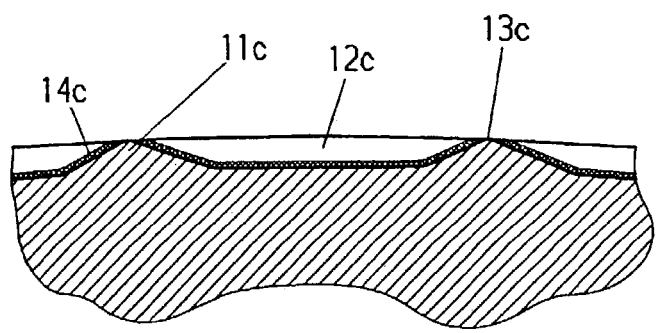
Figure 19:
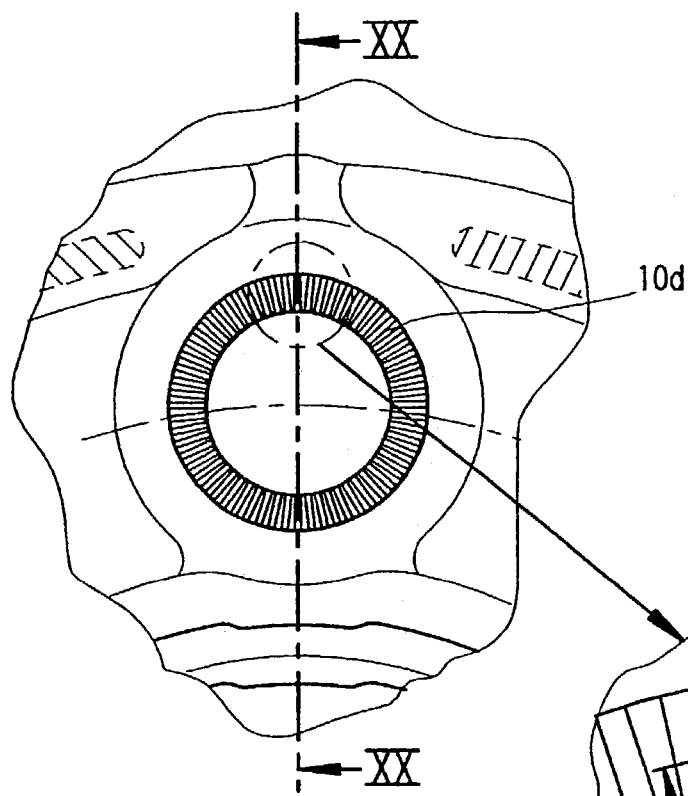
FIGS. 19–22 show diagrams similar to those of FIGS. 3 to 6, but the structured surface of the countersink is formed according to a fifth embodiment.
Figure 20:
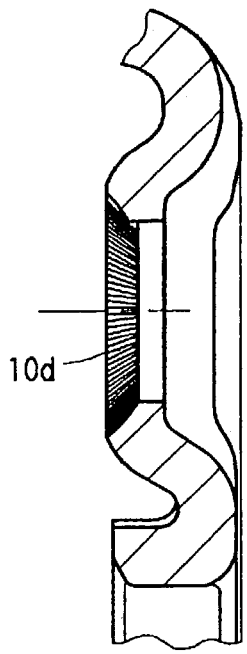
Figure 21:
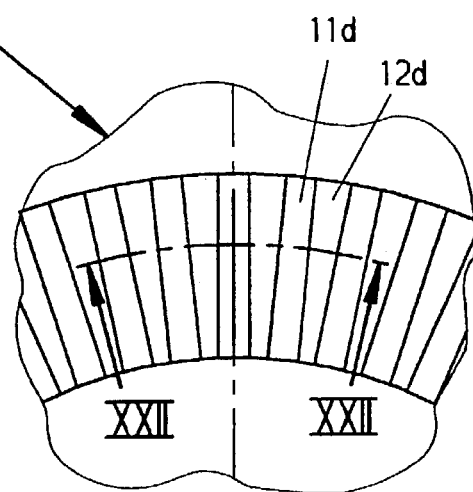
Figure 22:
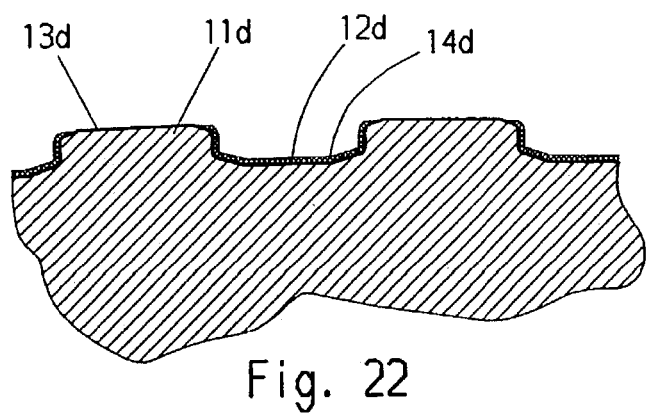
Figure 23:
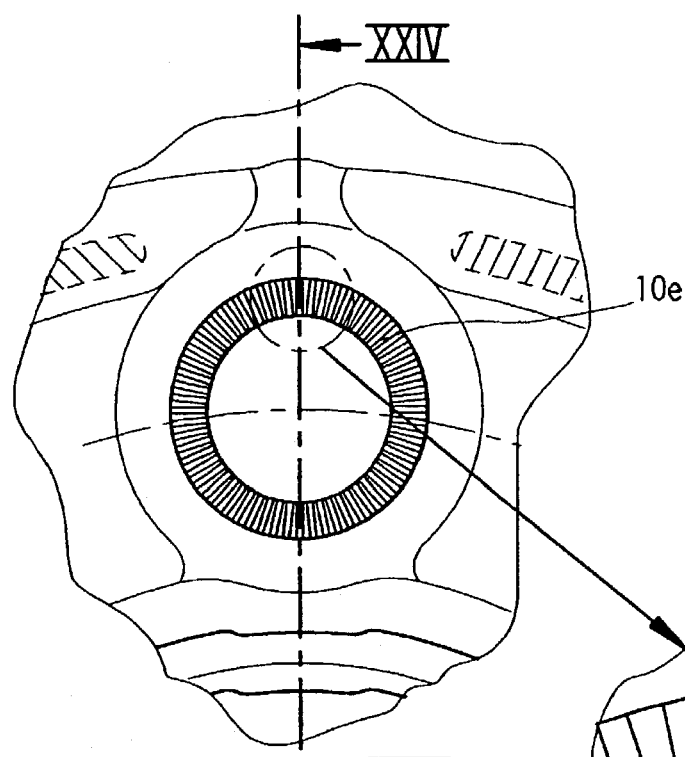
Figure 24:
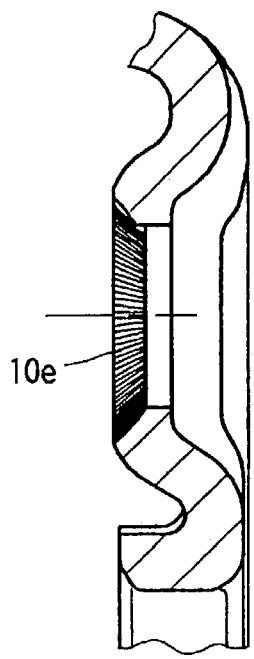
Figure 25:
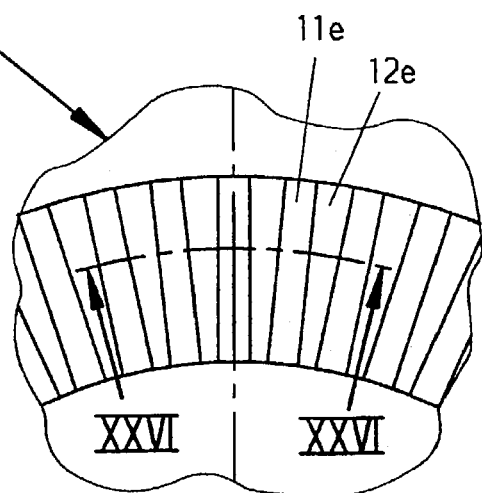
Figure 26:
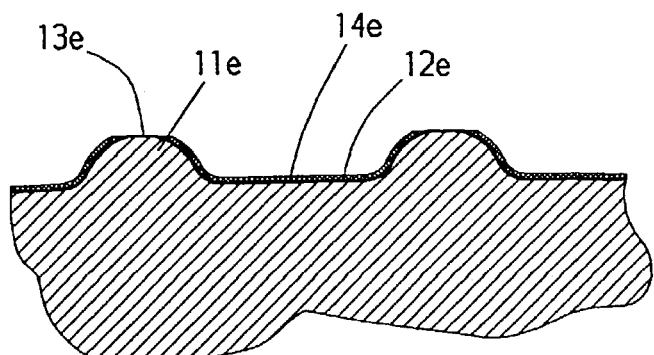

As is evident particularly in FIGS. 5 and 6, the elevations of the first embodiment are formed by radially linear, flat ribs 11 having a substantially rectangular cross-section. The ribs 11 alternate in the circumferential direction with indentations in the form of radially linear, flat grooves 12 which are U-shaped (cf. FIG. 6) in cross-section and slightly conical in plan view and have a width which is smaller at the radially inner end of the groove than at its radially outer end. The ribs 11 are substantially rectangular in plan view, as shown in FIG. 5. The upper surfaces 13 of the ribs 11 have the shape of a part of the surface of an imaginary sphere whose diameter is identical to that of a spherical surface which is formed at the centering collar 8 of the bolt head 9 of the wheel bolt 6.

In the mounted state of the wheel, the spherical surface of the centering collar 8 of the head 9 of the wheel bolt 6 rests concentrically against the spherical upper surfaces 13 of the ribs 11 of the structured surface 10 of the countersink 7. If the wheel is fastened by means of wheel bolts or wheel nuts which have a conical surface on the centering collar, the upper surfaces of the ribs have the shape of a part of the surface of an imaginary cone whose cone angle corresponds to that of the conical surface of the centering collar of these wheel bolts or wheel nuts. In the mounted state of the wheel, the conical surface of the centering collar of these wheel bolts and wheel nuts rests coaxially against the conical upper surfaces of the ribs of the countersink.

Figure 2:
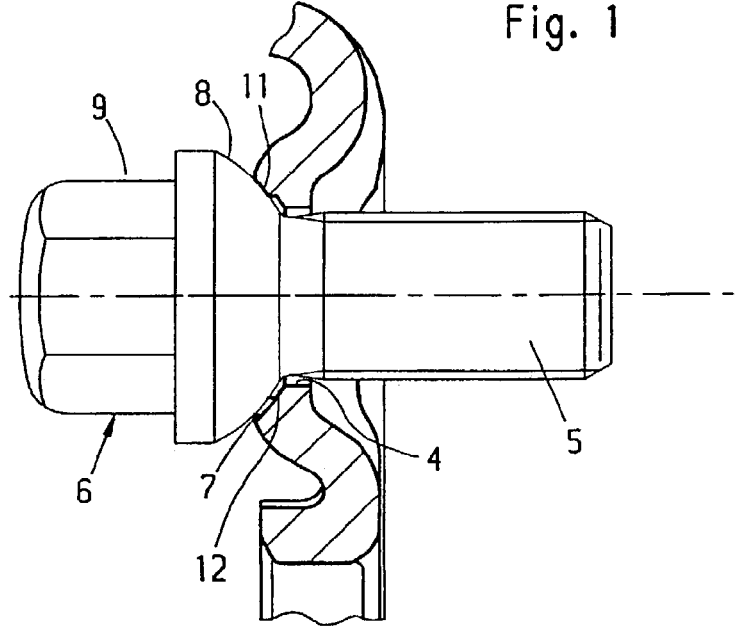
FIG. 2 shows a section, on a larger scale, along the line II—II in FIG. 1, together with the view of a wheel bolt which is arranged in the countersink of the corresponding connecting eye.
Figure 3:
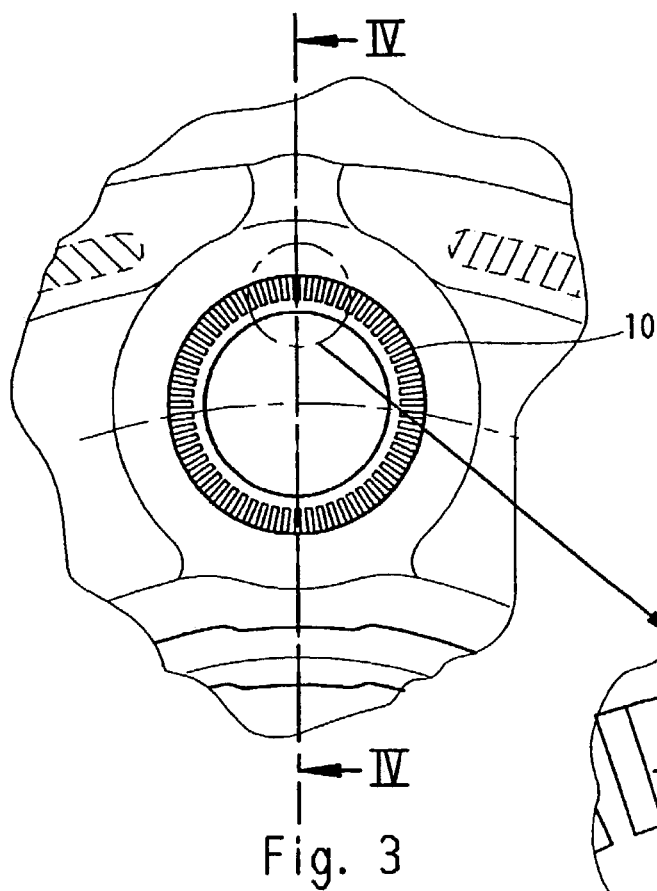
FIG. 3 shows a partial plan view on a larger scale of one of the connecting eyes of the wheel-center disk shown in FIG. 1.

As is evident from FIG. 2, the centering collar 8 rests only against the ribs 11 but not on the bottom of the grooves 12 when the wheel is mounted on the vehicle.

The center disk wheel is provided with one or more protective coats in order to protect the surface of the wheel from corrosion and also to impart an attractive appearance to the wheel. While the surface protection in the countersunk region of the wheel is produced by a pretreatment, which as a rule consists of a zinc phosphating, and a subsequent priming of the thus pretreated surface with a cathodic electrocoating finish, a further paint coat can, if required, be applied outside the countersunk region to the surface pretreated and primed as in the countersunk region. The upper surfaces 13 of the ribs 11 which are the contact surfaces for the wheel bolts 6 have no paint coat whereas a paint coat 14 is present on the lateral surfaces of the ribs 11 and on the bottom of the grooves 12, as shown in FIG. 6.

The wheel bolts 6 are also corrosion-protected by a surface coating. A preferred surface coating of the wheel bolts 6 is obtained by a surface treatment with the coating material sold by Dacral under the trade name "DAC-ROMET®320+ PLUS L". Wheel bolts can be corrosion-protected by a surface treatment with the same material. The wheel bolts 6 used for the center disk wheel according to the invention are suitable in the same design also for fastening cast light metal wheels, such as cast aluminum wheels, on the vehicle. The same applies to wheel nuts.

If the center disk wheel according to the invention is mounted on the vehicle, the wheel bolts 6 provided with the surface coating described rest directly on the upper surfaces 13 which form the contact surfaces of the respective countersink 7 and are without a paint coat, the coefficient of friction at the contact surfaces of the countersink being substantially constant also during driving and being such that the wheel bolts 6 cannot become loose during driving. All other areas of the countersink 7 and of the remaining wheel regions against which the wheel bolts 6 do not rest in the mounted state, such as the bottom surfaces of the grooves 12 and that surface region of the countersink 7 which is radially inside the structured surface 10, carry a paint coat as described above.

The paint coat can be removed from those upper surfaces 13 of the ribs 11 which form the contact surfaces before or during mounting of the wheel if it has been produced at all during coating of the countersunk region of the wheel on the upper surfaces 13 of the ribs 11. For production and economic reasons, the upper surfaces 13 of the ribs 11 are not left out during production of the surface protection of the countersunk region but are also coated. It is possible to remove the paint coat from the upper surfaces 13 of the ribs 11 before the initial mounting of the wheel by means of a suitable tool.

Preferably, however, this paint coat is removed only during the initial mounting of the wheel by the frictional effect produced on tightening the wheel bolts 6 and by the increasing pressure of the wheel nuts 6 on this paint coat. The paint abrasion can be picked up by the grooves 12. The same would happen on tightening the wheel nuts. Since the contact surfaces of the countersink are limited to the upper surfaces 13 of the ribs 11, there is a substantially higher pressure per unit area than if, as in the prior art, the total countersunk surface is available as a contact surface for the wheel bolts or wheel nuts. As a result of the increased pressure per unit area, the ribs 11 are plastically deformed, with the result that the material of the ribs, in particular in the region of the paint-free contact surfaces, is strengthened. This material strengthening increases the loosening torque of the wheel bolts. The plastic deformation of the ribs 11 and the associated strengthening of the material in the region of the upper surfaces 13 occur on initial tightening of the wheel bolts.

The embodiments shown in FIGS. 7 to 26 differ from the first embodiment shown in FIGS. 1 to 6 principally in the shape and size of the structured surface of the respective countersink. Therefore only the differences between the first embodiment and the further embodiments will be described in more detail below, parts of the further embodiments which are similar to corresponding parts of the first embodiment being denoted by the same reference numerals and by additional letters.

In all further embodiments, in contrast to the first embodiment, the structured surface 10a, 10b, 10c, 10d and 10e extends over the total surface of the countersink.

In the second embodiment shown in FIGS. 7 to 10, the ribs 11a forming the elevations have a cross-sectional shape which corresponds to a scalene triangle. In the representation chosen in FIGS. 7 to 10, the steeply descending flanks of the ribs 11a are arranged in each case to the left of their summit and are thus oriented in a direction opposite to the clockwise tightening direction of the wheel bolts or wheel nuts. In this representation, the gently descending flanks of the ribs 11a are arranged to the right of their summit. The indentations 12a arranged in each case between two adjacent ribs 11a are slightly conical with a width decreasing toward the inside in the radial direction, as shown in FIG. 9. The paint-free contact surfaces 13a extend in the form of a band to the summits of the ribs 11a. The steep flanks and the gentle flanks of the ribs 11a and the bottom of the indentations 12a carry a paint coat 14a.

In the third embodiment shown in FIGS. 11 to 14, the structured surface 10b of the countersink has a multiplicity of rhombus-shaped indentations 12b which are distributed in the circumferential direction and in the radial direction and are separated from one another by web-like elevations 11b which have a substantially rectangular cross-section. The paint-free contact surface 13b extends over the top of each web-like elevation 11b. The lateral surfaces of the web-like elevations 11b and the bottom surface of the rhombus-shaped indentations 12b have a paint coat 14b. It is understood that, in the third embodiment, the elevations and indentations may be reversed, i.e., multiple rhombus-shaped elevations being provided.

In the fourth embodiment shown in FIGS. 15 to 18, the structured surface 10c has a multiplicity of ribs 11c which are distributed in the circumferential direction, are arc-shaped and are triangular in cross-section. An arc-shaped groove 12c is present in each case between two adjacent ribs 11c. The cross-section of the ribs 11c corresponds to an isosceles triangle. The two limbs of the cross-sectional triangle of the ribs 11c are provided, apart from their region close to the summit, with a paint coat 14c which continues on the bottom of the grooves 12c. The summit region of each rib 11c forms a paint-free contact surface 13c.

In the fifth embodiment shown in FIGS. 19 to 22, the indentations and elevations of the structured surface 10d are formed in each case virtually identically to those in the first embodiment; they differ from this only in the radial length which, as already mentioned, extends over the total surface of the countersink. The elevations and indentations of the structured surface 10d consist of ribs 11d and grooves 12d, respectively. The paint-free contact surfaces 13d are present on the top of the ribs 11d which are rectangular in cross-section. A paint coat 14d is applied to the lateral surfaces of the ribs 11d and to the bottom of the grooves 12d.

In the sixth embodiment shown in FIGS. 23 to 26, the ribs 11e have rounded lateral surfaces coated with paint and a flat summit which forms the paint-free contact surface 13e. A groove-like indentation 12e which has at the bottom the paint coat 14e which continues on the lateral surfaces of the ribs 11e is present between in each case two radially linear ribs 11e.

As in the first embodiment, in all further embodiments the paint-free contact surfaces are preferably either spherical or conical with a sphere diameter or cone angle which corresponds to that of the correspondingly shaped centering collar of the wheel nuts or wheel bolts.

The present invention can allow for fastening a coated center disk wheel produced from sheet metal to the wheel hub of a motor vehicle, in such a way that, while retaining satisfactory corrosion protection of the wheel bolts or wheel nuts and of the countersink of the connecting eyes, unintentional loosening of the wheel bolts or wheel nuts after mounting of the center disk wheel is reliably avoided. This may permit wheel bolts or wheel nuts of the same design both for coated sheet-metal center disk wheels and for cast light metal wheels, such as, for example, cast aluminum wheels.

A coated center disk wheel of the present invention can have a coefficient of friction at the contact surfaces between the wheel nuts or wheel bolts and the countersink after the initial mounting of the center disk wheel on the motor vehicle that causes no unintentional loosening of the wheel nuts or wheel bolts.

As a result of the present invention, it is possible to have a protective coat only on those surfaces of the center disk wheel which, in the mounted state, are not in contact with the wheel nuts or wheel bolt heads while in the pre-mounted state, the surfaces that are in contact would also have been coated with the protective coating. The coefficient of friction at the uncoated contact surfaces where the coating has been abraded during the mounting procedure, remains substantially constant even when the wheel hub region is heated up during driving. The consequence of a higher but substantially constant coefficient of friction at the contact surfaces of the countersink is that the pretensioning force and therefore the pressure between the connecting eyes and the wheel hub during driving also remain substantially constant and are reproducible in the same magnitude with the specified tightening torque even after mounting and removal of the wheel several times. The danger of loosening of the wheel nuts or wheel bolts during driving is thus reliably ruled out. The means according to the invention also has the advantage that the paint coat can also be present on the bolt or nut contact surfaces of the countersink until the wheel is mounted for the first time, so that the center disk wheel is corrosion-protected on these contact surfaces too before the initial mounting. This advantage is evident in particular when the center disk wheel is used only as a spare wheel for a motor vehicle otherwise equipped with cast aluminum wheels, and this spare wheel is never used or is used for the first time only after a few years of operation of the motor vehicle.

An advantage of the method according to the invention is that the structuring of the surface of the countersink or of a part thereof can be carried out in the same operation as the formulation of the countersink by means of a single, correspondingly shaped tool. Furthermore, the method according to the invention has the advantage that the surface protection system in the countersink region can be provided as in the past over the entire surface of the countersink without interruption, because the surface coating on the subsequent bolt or nut contact surfaces of the countersink can be retained until the wheel is mounted for the first time. The method according to the invention is therefore at least as economical as the production method to date.

The center disk wheel according to the invention has the advantage that it can be mounted on a motor vehicle with the same wheel bolts or wheel nuts which are also used for fastening a cast aluminum wheel. If, for example, a motor vehicle having cast aluminum wheels is equipped for summer operation, a center disk wheel according to the invention can be used as a spare wheel or as a winter wheel without having to rely on wheel nuts or wheel bolts which differ from those which are used for the cast aluminum wheels. The use of so-called standard bolts both for cast aluminum wheels and for coated center disk wheels according to the invention is economical and also helps to prevent accidental confusion or misuse of wheel nuts or wheel bolts of different designs.

The coat is preferably removed from the contact surfaces of the elevations of the structured surface of the countersink by the friction produced between the wheel bolts or wheel nuts and the coat during tightening of said bolts or said nuts during mounting of the wheel. Therefore, no additional operation and no additional tool for removing the paint coat on the contact surfaces of the elevations are required before the wheel is mounted for the first time. Because the contact surface between wheel bolt head or wheel nut and countersink is smaller in comparison with center disk wheels to date, the pressure per unit area increases. The paint coat on the elevations is removed by the rotational movement of the bolt or nut and the increasing bolt pretensioning force, resulting, after the predetermined tightening torque has been reached, in the desired coefficient of friction, which no longer changes substantially even during driving, so that the wheel nuts or wheel bolts cannot become loose during driving. As a result of the removal of the paint coat on the contact surfaces of the countersink, there is no paint coat between the countersink and the wheel bolt or wheel nut, which paint coat becomes unstable as a result of heating and operating loads. Loosening of the wheel bolts or wheel nuts due to the destabilization of the paint coat between the countersink and the bolts or nuts is thus ruled out.

By omitting or removing a paint coat on the contact surfaces of the countersink, the coefficient of friction at these contact surfaces increases in comparison with a coated surface. At a constant tightening torque, an increase in the coefficient of friction results in a decrease in the pretensioning force which, if it is too great, would expand the countersink with the result that cracking may occur in the countersink. The increase in the coefficient of friction by omission or removal of the paint coat on the contact surfaces of the countersink is therefore advantageous since this increase in the coefficient of friction counteracts the danger that too high a torque will be applied to the wheel bolts or wheel nuts during mounting of the wheel.

After the initial tightening of the wheel bolts or wheel nuts, in which the paint coat on the contact surfaces of the countersink is removed, the elevations may undergo plastic deformation, which in turn strengthens the material in the region of the elevations and paint-free contact surfaces. Strengthening of the material in the region of the elevations and paint-free contact surfaces results in an increase in the torque required for loosening the wheel bolts or wheel nuts. The danger of loosening of the wheel bolts or wheel nuts during driving is therefore further reduced by the strengthening of the material in the region of the elevations and paint-free contact surfaces.

What is claimed is:

1. A sheet-metal center disk wheel for a motor vehicle, comprising:
    a wheel-center disk (1) provided with a plurality of bolt holes (3) distributed along a hole circle (2), each bolt hole having a through-hole (4) surrounded by a countersink (7) having a surface provided with elevations and indentations including at least 3 elevations or at least 3 indentations, at least the indentations being provided with a protective coating, the elevations having contact surfaces configured and dimensioned to contact a centering collar of a wheel bolt or a wheel nut, when the center disk wheel is mounted on the wheel hub or brake drum of a motor vehicle, and wherein the protective coating remains on said indentations and the contact surfaces are substantially free of protective coating, after the contact surfaces are contacted by said centering collar and the wheel bolt or wheel nut is tightened.

2. The sheet-metal center disk wheel according to claim 1, wherein the contact surfaces collectively form the shape of part of a cone or part of a sphere.

3. The sheet-metal center disk wheel according to claim 1, wherein the elevations and indentations are present only on an upper edge of the countersink.

4. The sheet-metal center disk wheel according to claim 1, wherein the elevations and indentations comprise ribs and grooves, respectively, which alternate along a circumferential direction of the corresponding countersink.

5. The sheet-metal center disk wheel according to claim 4, wherein the elevations and indentations extend in the radial direction of the corresponding countersink.

6. The sheet-metal center disk wheel according to claim 4, wherein the elevations and indentations are arc-shaped ribs and grooves, respectively.

7. The sheet-metal center disk wheel according to claim 4, wherein the elevations have a rectangular or triangular cross-section.

8. The sheet-metal center disk wheel according to claim 1, wherein each countersink surface is provided with at least 3 elevations and at least 3 indentations.

9. The sheet-metal center disk wheel according to claim 1, provided with a protective coating at least over both the elevations and indentations, including the contact surfaces.

10. A sheet-metal center disk wheel in combination with a wheel hub or brake drum of a motor vehicle on which said center disk wheel is mounted, comprising:
    a wheel-center disk (1) provided with a plurality of bolt holes (3) distributed along a hole circle (2), each bolt hole having a through-hole (4) surrounded by a countersink (7) having a surface provided with elevations and indentations including at least 3 elevations or at least 3 indentations; and
    wheel bolts or wheel nuts securing the wheel-center disk to the wheel hub or brake drum and abutting contact surfaces belonging to the elevations of each of the countersinks, the wheel bolts or wheel nuts not being in contact with the indentations;
    wherein a protective coating is provided on at least the indentations, the contact surfaces being substantially free of protective coating.

11. A sheet-metal center disk wheel mounted on a wheel hub or brake drum of a motor vehicle according to claim 10, wherein each countersink surface is provided with at least 3 elevations and at least 3 indentations.

12. A method of securing a sheet-metal center disk wheel to a wheel hub or brake drum of a motor vehicle, the method comprising: providing a center disk wheel comprising a wheel-center disk (1) provided with a plurality of bolt holes (3) distributed along a hole circle (2), each bolt hole having a through-hole (4) surrounded by a countersink (7) having a surface provided with elevations and indentations including at least 3 elevations or at least 3 indentations, said elevations and said indentations being provided with a protective coating;
    aligning the center disk wheel with the wheel hub or brake drum; and
    securing the center disk wheel to the wheel hub or brake drum by tightening wheel bolts or wheel nuts by rotation such that, during said rotation, said wheel bolts or wheel nuts abut the elevations at contact surfaces and abrade protective coating from said contact surfaces by friction while protective coating on the indentations is left substantially intact.

13. The method according to claim 12, wherein at least a portion of said protective coating is captured by said indentations, as said portion is abraded from said contact surfaces.

14. The method according to claim 13, comprising providing a center disk wheel having indentations of a size sufficient to accommodate all of said protective coating that is abraded from said contact surfaces.

15. The method according to claim 12, comprising providing a center disk wheel having at least 3 elevations and at least 3 indentations.

16. A coated sheet-metal center disk wheel for motor vehicles, comprising a wheel-center disk (1) which has a plurality of bolt holes (3) which are distributed over a hole circle (2) and have in each case a through-hole (4) and, around the hole, a countersink (7), at least a part of the surface of each countersink being provided with elevations and indentations including at least 3 elevations or at least 3 indentations, and wherein in the mounted state of the center disk wheel, a wheel bolt or wheel nut that is used to secure the center disk wheel to a wheel hub or brake drum of the motor vehicle, is in contact with at least one contact surface present on the elevations, said at least one contact surface being substantially free of a protective coating that is present on the indentations and is also present on those portions of the elevations that are not in contact with said wheel bolt or wheel nut.

17. The coated sheet-metal center disk wheel according to claim 16, comprising at least 3 elevations and at least 3 indentations.

18. A method for fastening a coated sheet-metal center disk wheel to the wheel or brake drum of a motor vehicle, the center disk wheel having a wheel-center disk (1) which has a plurality of bolt holes (3) which are distributed over a hole circle (2) and have in each case a through-hole (4) and, around the hole, a countersink (7), at least a part of the surface of each countersink being provided with elevations and indentations including at least 3 elevations or at least 3 indentations, said elevations and indentations being provided with a protective coating; the method comprising:

aligning the center disk wheel with the wheel hub or brake drum; and tightening wheel bolts or a wheel nuts to secure the center disk wheel to the wheel hub or brake drum by rotation such that, during said rotation, said wheel bolts or wheel nuts abut the elevations at contact surfaces of the elevations and abrade protective coating from said contact surfaces by friction, thereby resulting in a mounted state of the center disk wheel on the wheel hub or brake drum in which said contact surfaces are substantially free of said protective coating while said indentations and portions of said elevations not in contact with said wheel bolts or wheel nuts retain said protective coating.

19. The method according to claim 18, wherein at least a portion of said protective coating is captured by said indentations, as said protective coating is abraded from said contact surfaces.

20. The method according to claim 19, comprising providing a wheel-center disk having indentations of a size sufficient to accommodate all of said protective coating that is abraded from said contact surfaces.

* * * * *